Patented Apr. 1, 1941

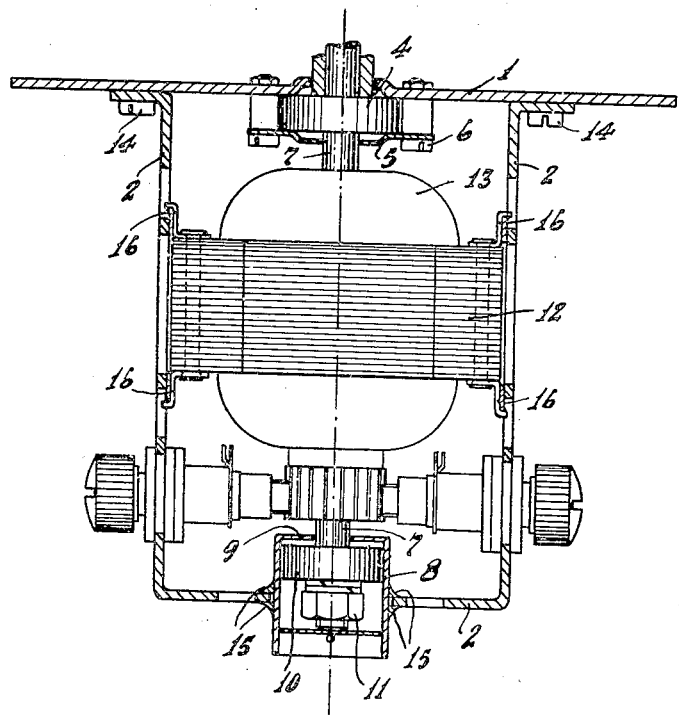

2,236,956

UNITED STATES PATENT OFFICE 2,236,956

MOTOR AND DYNAMO

Leonardus Wilhelmus van der Heem, The Hague, Netherlands, assignor to N. V. Radiofabriek en Ingenieursbureau voorheen van der Heem & Bloemsma, The Hague, Netherlands, a corporation of the Netherlands Application July 1, 1938, Serial No. 217,110
In the Netherlands August 25, 1937

5 Claims. (Cl. 171—252)

The invention relates to a method of mounting small electromotors and dynamos and to a motor or dynamo manufactured according to the said method, and especially to motors and dynamos mounted on brackets, such as for example in vacuum cleaner motors. The invention has for its object to secure an easily adjustable and cheap construction.

The method according to the invention is characterized in that first the stator body is arranged around the armature which at one side has its ballbearing clamped against one bracket and at the other side of the shaft is attached with a ball bearing in a bushing, and then the clasp forming the lower bracket is arranged over the whole and attached to the upper bracket, for example by means of screws, and the lower shaft-bearing bush is soldered in a perforation of the lower bracket. A further feature is, that by the arrangement of spacing members in the air gap between the rotor and the stator, the stator is brought into correct position and fixed in such position by soldering to the clasp forming the lower bracket.

Thus an electromotor or dynamo is manufactured in which one bearing of the rotor shaft is attached by means of screws or clamps to one of the brackets, and the other shaft-bearing is clamped in a bush, which has been attached in the second bracket by soldering so, that it is free of tension in radial as well as in axial direction.

According to the invention the second bracket comprises a metal clasp attached by means of screws or the like to the first bracket, with the stator being soldered in the said clasp.

An embodiment of the invention is illustrated in the drawing in which the figure is a front view with parts in section.

According to the invention the upper bracket 1 of the motor consists of a metal strip, and the lower bracket consists of a metal clasp 2.

The method according to the invention is carried out as follows:

The armature with the shaft 7, provided with a ball-bearing 4 is clamped by means of a cap 5 with bolts 6 against the upper bracket 1. Between the said bearing and the cap a sufficient play is present. At the underside of the armature a rather thin metal bush 8 is arranged about the rotor shaft 7 and said bush is provided at the upper side with axial ribs which are directed inwardly with a bottom 9 having a perforation through which the shaft 7 extends. The lower ball-bearing 10 is pressed into the bush 8. Thereby the thin-walled bush 8 is distorted so that no considerable undesirable radial forces will be exerted on the outer ballring of the bearing 10. The bearing 10 is clamped on the shaft 7 by a nut 11.

Now the stator, comprising the stator arm 12 and stator windings 13, is slipped over the armature and then the clasp 2, forming the lower bracket, is arranged over it. In the said lower bracket 2 an opening is made, in which the bush 8 fits with considerable play. If now the lower bracket is secured to the upper bracket 1 by means of the screws 14, the armature with the bush 8 will occupy in the opening of the clasp 2 such a position that no axial or radial forces are exerted on the shaft 7 or on the bearings 4 and 10. Now according to the invention the bush 8 is soldered in the said position in the lower bracket or the clasp 2 at 15.

Thereupon easily removable spacing members, which have not been illustrated, having the thickness of the air gap are arranged between rotor and stator. Finally the stator is soldered to the lower bracket in such centered position with the aid of clips 16, whereupon the spacing members are removed.

The advantage of the construction is that expensive and precise borings for the bearings and centering edges for the engagement of the brackets are avoided, and the lower bracket is a simple clasp of metal plate. The mounting and the precise adjustment are very simple.

I claim:

1. A method of mounting small electromotors and dynamos comprising clamping the bearing supporting one side of the armature to a bracket, then arranging the stator core about said armature, then securing a second bracket to said first mentioned bracket so as to enclose said stator core and then securing said stator core to said second bracket in predetermined spaced relation to said armature.

2. A method of mounting small electromotors and dynamos comprising clamping the bearing supporting one side of the armature to a bracket, then arranging the stator core about said armature, then securing a second bracket to said first mentioned bracket so as to enclose said stator core, then securing said stator core to said second bracket in predetermined spaced relation to said armature and securing the bearing supporting the other side of said armature to said second bracket.

3. A method of mounting small electromotors and dynamos comprising clamping the bearing supporting one side of the armature to a bracket, then arranging the stator core about said armature, then securing a second bracket to said first mentioned bracket so as to enclose said stator core, then securing said stator core to said second bracket in predetermined spaced relation to said armature and then securing a bushing about the bearing supporting the other side of said armature to said second bracket by soldering.

4. A method of mounting small electromotors and dynamos comprising securing the bearing supporting one side of an armature to a bracket, then frictionally securing a bushing about the bearing supporting the other side of said armature, then arranging the stator core about said armature in predetermined spaced relation, then securing a second bracket to said first bracket so as to enclose said stator core and armature, then securing said stator core to said second bracket and then securing said bushing to said second bracket.

5. A method of mounting small electromotors and dynamos comprising securing the bearing supporting one side of an armature to a bracket, then frictionally securing a bushing about the bearing supporting the other side of said armature, then arranging the stator core about said armature in predetermined spaced relation, then securing a second bracket to said first bracket so as to enclose said stator core and armature, then securing said stator core to said second bracket by soldering and then securing said bushing to said second bracket by soldering.

LEONARDUS WILHELMUS van der HEEM.